United States Patent [19]

Lombard et al.

[11] Patent Number: 4,637,246
[45] Date of Patent: Jan. 20, 1987

[54] AXIAL ACCELERATION SENSOR

[75] Inventors: Claude Lombard, Chesnay; Claude Moyses, Paris; Gerad Catier, Issy Les Moulineaux; Bernard Montaron, Toulouse, all of France

[73] Assignees: Regie Nationale des Usines Renault, Boulogne Billancourt; Renix Electronique, Toulouse, both of France

[21] Appl. No.: 676,808

[22] Filed: Nov. 30, 1984

[30] Foreign Application Priority Data

Dec. 2, 1983 [FR] France ............................ 83 19294
May 29, 1984 [FR] France ............................ 84 08380

[51] Int. Cl.4 ......................................... G01L 23/22
[52] U.S. Cl. ................................ 73/35; 310/329; 310/363
[58] Field of Search .............. 73/35, 654; 310/329, 310/363, 364

[56] References Cited

U.S. PATENT DOCUMENTS

| | | | |
|---|---|---|---|
| 3,060,333 | 10/1962 | Bradley, Jr. | 310/329 |
| 3,075,098 | 1/1963 | Shoor | 310/329 |
| 3,145,311 | 8/1964 | Dickey | 310/329 |
| 3,487,238 | 12/1969 | Angleton, et al. | 310/329 |
| 3,586,889 | 6/1971 | Kolter | 310/363 |
| 4,354,131 | 10/1982 | Kaji | 310/329 |
| 4,404,489 | 9/1983 | Larson, III et al. | 310/334 |
| 4,463,596 | 8/1984 | Asakura | 73/35 |

*Primary Examiner*—Stephen A. Kreitman
*Assistant Examiner*—Scott M. Oldham
*Attorney, Agent, or Firm*—Oblon, Fisher, Spivak, McClelland & Maier

[57] ABSTRACT

A piezoelectric sensitive element has elements for collecting charges appearing between the sides of the piezoelectric element. These elements include a flexible insulating strip having one the same face two distinct conductive layers each of which has an annular layer for contact with the piezoelectric sensitive element and connected by a connecting layer to a terminal layer. Application is to the detection of pinging in internal combustion engines.

7 Claims, 7 Drawing Figures

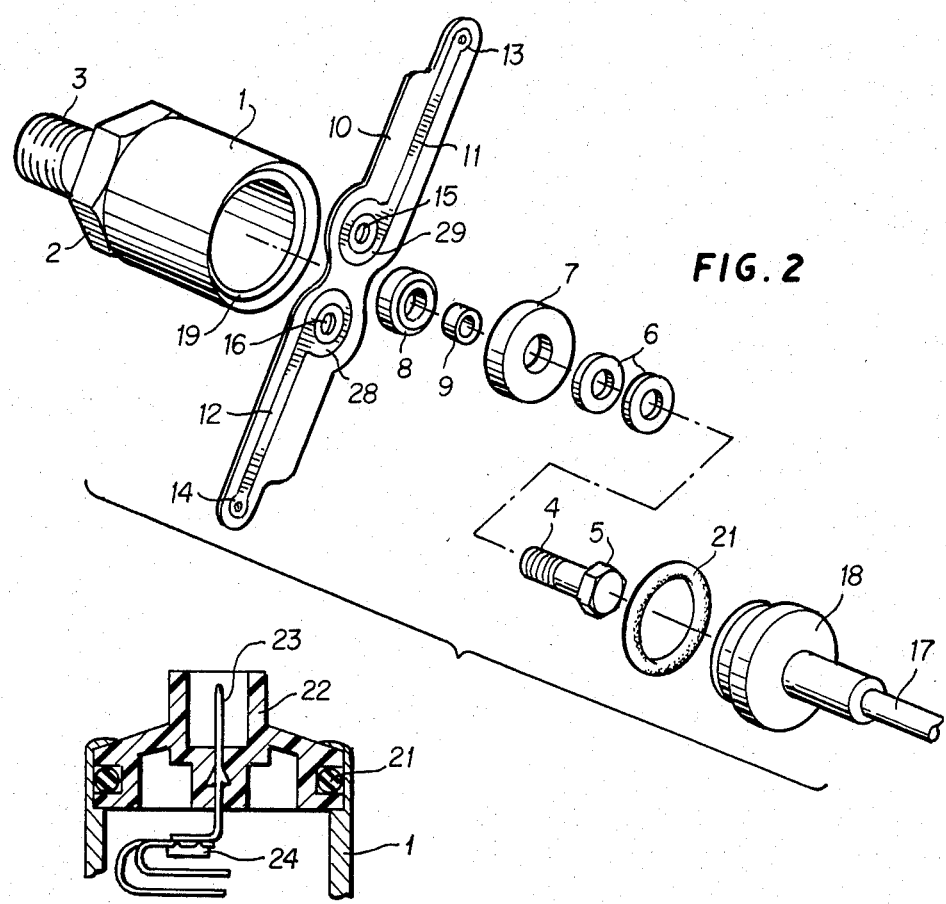
FIG. 2
FIG. 4
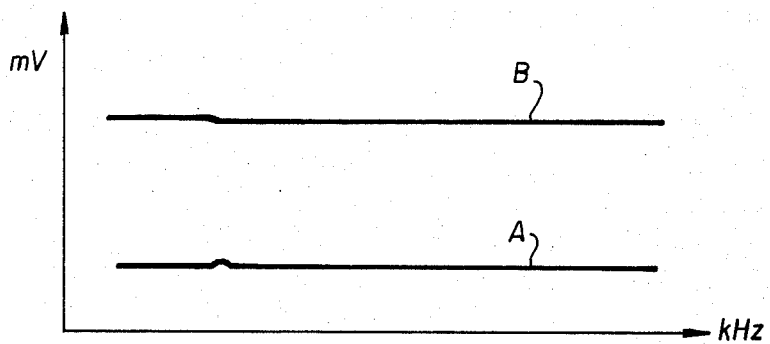
FIG. 5

AXIAL ACCELERATION SENSOR

BACKGROUND OF THE INVENTION

1. Field of the Invention

This invention relates to an axial acceleration sensor particularly suited to detection of pinging of internal combustion engines.

2. Related Art

It is known that the fundamental frequencies generally encountered during pinging are between 5 and 15 kilohertz for the usual cylinder engines. But it is also necessary, in electronic processing of the signal, to reject other frequencies that correspond to mechanical phenomena due to running of the engine. The characteristic frequencies of both the pinging and spurious phenomena vary from one engine to the next.

For this reason, it is advantageous to have a sensor having a flat frequency response between 1 and 15 kilohertz and beyond, these frequencies being cited by way of nonlimiting example. A good acquisition of the spurious signals makes it possible to filter them electrically in an effective manner.

The prior art of low-cost pinging sensors made from the usual materials machined with low precision relates, on the one hand, to sensors tuned mechanically to a frequency, for example, 6 KHz, which must be adapted to each type of combustion chamber and, on the other hand, to flat frequency response curve sensors. However, experience shows that these latter actually exhibit strong scatterings in the response in at least two frequency zones.

One of the scattering zones is located at high frequencies and results from the fact that, on the one hand, there are numerous rigidities and masses in the kinematic chain and, on the other hand, considering the propagation speeds of sound in the materials used, a quarter-wave is approached in the stacking of parts contributing to the sensitivity of the sensor.

The other zone is located at low frequencies where there are very variable resonances due to the connections on both sides of the piezoelectric element, connections whose mass is not negligible.

Sensors used in the instrumentation field generally are free of these defects but their output signal is very weak, because they use quartz and not ceramic, and their cost is high because of their miniaturization and precision.

SUMMARY OF THE INVENTION

The object of this invention is to reduce these drawbacks and for this purpose it relates to a sensor for axial accelerations and particularly for the detection of pinging in an internal combustion engine on the one hand, having a case including a base intended to be fastened in the part to be studied and a cap having electrical output connecting means for the sensor and a piezoelectric element, a seismic mass and locking means mechanically binding them to the base of the case and applying a prestress to them by elements acting as a spring. It further comprises flexible electrical connection means in the form of a strip of flexible insulating material on whose one face are deposited two distinct conduction layers, each consisting of an annular layer and a connecting layer coming from the annular layer and ending at a terminal layer located at one end of the strip, this flexible strip being folded on both sides of the piezoelectric element so that the annular layers are in electric contact with the two faces of the piezoelectric element and the terminal layers are in electric contact with the output connecting means of the sensor.

BRIEF DESCRIPTION OF THE DRAWINGS

Other characteristics and advantages of the invention will come out from the following description illustrated by the following figures:

FIG. 2 is an exploded view of the sensor of FIG. 1;

FIG. 4 is a variant embodiment showing a direct connection of the polyimide strip to an output connector;

FIG. 5 is a curve giving the output voltage of a sensor as a function of the frequency for two different acceleration values A and B;

The various elements providing the same functions for the same results are referenced identically in the various figures.

DETAILED DESCRIPTION OF THE PREFERRED EMBODIMENTS

Figure 1:
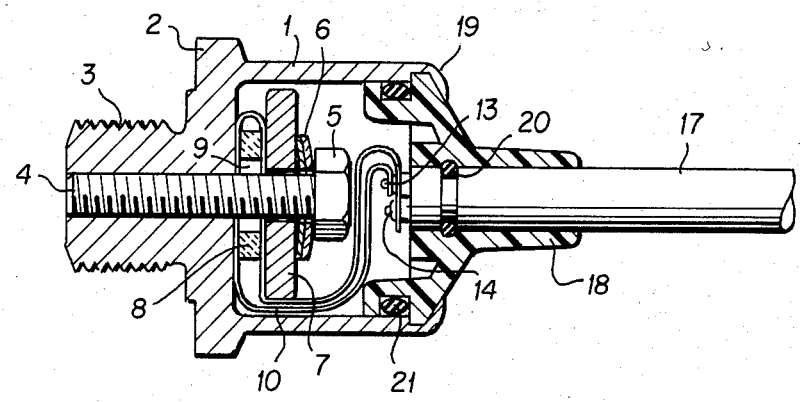
FIG. 1 is a cross section view of a pinging sensor according to a first embodiment of the sensor.

FIG. 1 shows a sensor according to the invention after assembly of the various elements that make it up, while FIG. 2 shows an exploded view of it before assembly.

The sensor has a case 1, generally of steel, having a rigid base 2 carrying a threading 3 intended to be screwed into the part whose vibrations are to be measured. The output connecting means of the sensor are fastened to cap 18 of the case. On the other hand, the sensor has a piezoelectric element 8 against which a seismic mass 7 rests by locking means mechanically binding them to the base of the case and applying a prestress to them thanks to elements acting as springs. The locking means, for example, consist of a headed cylindrical element such as a large-diameter screw 4 having a head 5. This screw 4 should be as rigid as possible and can be a through screw. In this case, the screw 4 extends through apertures of piezoelectric element 8, seismic mass 7 and the spring means. The spring means consist, for example, of conical elastic washers 6, particularly of the Belleville spring washer type. It will be noted that in FIG. 1 the point of support of conical washers 6 is approximately axially opposite piezoelectric element 8 and on the inside of its perimeter.

The sensor further has flexible electrical connection means between piezoelectric element 8 and the output means, consisting of a an elongate strip 10 of flexible insulating material on whose are flat face are deposited two distinct conduction layers or metallizations providing the electric connection. These metallizations are made, for example, by tinned copper deposit. As shown more precisely in FIG. 3, each of these metallizations define an annular layer or a pellet 28–29, with dimensions close to these of piezoelectric element 8 and having a connecting layer of conductor 11–12 coming from the pellet and ending at a metallized terminal layer or connecting zone 13-14 located at one end of the strip. During assembly of the sensor, this flexible strip 10 is folded on both sides of piezoelectric element 8 so that the conductive pellets are in electric contact with the two faces of the piezoelectric element, acting as electrodes, for collecting the electric charges appearing on both sides of piezoelectric element 8, so that zones 13 and 14 are in electric contact with the output connecting means of the sensor.

Flexible strip 10 thus serves as an electric connection but also as electrical insulation between piezoelectric element 8 and seismic mass 7, on the one side, and base 2 of case 1, on the other side. This strip therefore offers the advantage of reducing the number of parts placed in the sensor, since it replaces two insulating washers to be placed on both sides of the piezoelectric element, reducing the axial bulk and total weight. For these same reasons, the sensor according to the invention is formed as a relatively flat, disk-shaped seismic mass.

In the case of a through screw 4, on which the seismic mass and piezoelectric element particularly are slipped, conductive pellets 28-29, deposited on the insulating strip, are pierced by apertures 15-16 intended for passage of the screw. In this case, to assure electrical insulation between screw 4 and piezoelectric element 8, these conductive pellets have an inside diameter greater than the diameter of the passage opening of the screw. A contact adhesive product can be added to the faces of insulating barrel 9 to allow preassembly of the unit of strip 10, piezoelectric element 8, barrel 9 and cap 18 before insertion in the case of sensor 1. The insulating material constituting the strip is crushed somewhat under the mechanical stress during high temperature tests.

As shown in FIGS. 1 and 2, the output connecting means of the sensor consist of a cable 17 molded into cap 18 of case 1. The cap 18 is plastic, for example, and is crimped at 19 by a shoulder of case 1.

Cable 17 carries a stop joint 20 keeping it from beng pulled out and also carries an O-ring 21 providing fluid-tightness of the apparatus between cap 18 and case 1. The two wires of cable 17 are electrically connected—by soldering for example—to the two connecting metallized zones 13 and 14 located at the ends of the strip 10, these zones in this case consisting of holes or eyelets that are metallized.

In the case of FIG. 4, the output connecting means of each sensor consist of a pin connector. To case 1 of the sensor is fastened a socket 22 of insulating material carrying metal pins 23 each having an end 24, located in case 1, intended to squeeze an end of strip 10 at one of the metallized terminal layers. Thus, a solderless connection is made at a high production rate.

The functioning of the sensor is in accordance with sensors of this type, i.e., the stress variations exerted on piezoelectric element 8 by the seismic mass under the effect of the vibrations cause changes, and therefore voltages, to appear between the two faces of the piezoelectric element.

The possible bending vibrations of flat washer 7 acting as a seismic mass will cause little trouble to the functioning of the sensor as shown in FIG. 5 which is an corrected output voltage reading of the sensor for two acceleration values.

Figure 3:
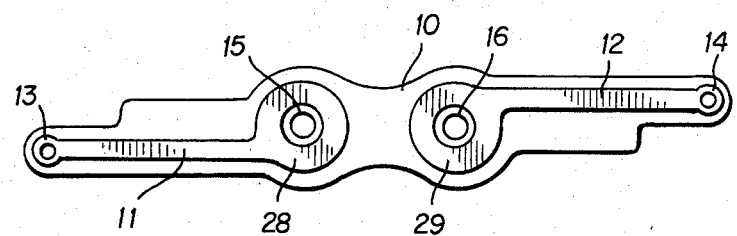
FIG. 3 is a front view of the flexible strip before assembly of the sensor, according to the first embodiment.
Figure 6:
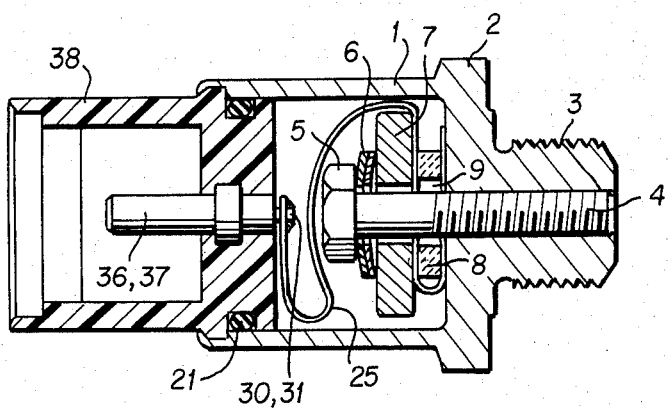
FIG. 6 is a cross section view of a sensor according to the invention, according to a second embodiment.
Figure 7:
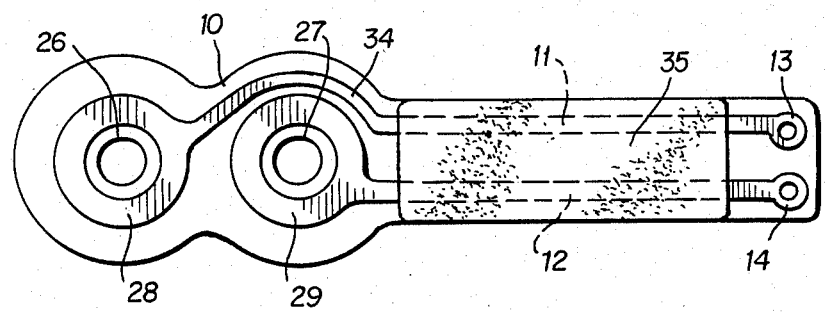
FIG. 7 is a front view of the flexible strip before assembly of the sensor, according to the second embodiment.

FIG. 6 is a cross section view of a sensor in which the flexible strip acting as a connection between piezoelectric element 8 and the sensor output is made according to an embodiment different from that of FIG. 3. In this second embodiment connecting conductors 11 and 12 end at the same end of the strip, thus making it possible to reduce the surface of the strip that is used and, to a certain extent, the addition of undesirable mobile masses to the piezoelectric sensitive element.

As above, on the same face of flexible insulating strip 10 are deposited two distinct metallizations consisting of two aligned pellets 28 and 29, of which one, 28, is at one end of the strip, and of two connecting conductors 11 and 12 each coming from a pellet, placed parallel and ending at the two metallized connecting zones 13 and 14 located at the other end of the strip. For this purpose, conductor 11, coming from pellet 28, goes around pellet 29, forming a curve 34. Strip 10 therefore has an asymetric shape. In the case of locking through screw 4, pellets 28 and 29 are pierced with holes 15-16.

As above, during assembly of strip 10 in case 1 of the sensor, the strip is folded on both sides of piezoelectric element 8 to make electrodes. Since metallized connecting zones 13 and 14 are placed side by side on the strip, they can be made simply by drilled or undrilled pellets, since they are on the same side with respect to the output connecting means of the sensor. In FIG. 6, these connecting means consist of a connector 38, molded in plastic for example, having two conductive tongues 36 and 37 which are made to go through the drilled pellets of the strip and which are connected electrically, for example, by soft brazing with tin.

To prevent contact of conductors 11 and 12 with metal case 1 a protective strip 35 is placed on insulating strip 10 above conductors 11 and 12.

The sensor of the invention is characterized by the new combination of the three following factors which contribute to obtaining great quality in the response of a piezoelectric type sensor. In particular, a flat shape of the seismic mass, easy to obtain by punch pressing, makes it possible to avoid quarter-wave resonances, an adjustment of the prestress by a locking screw with slight elasticity compressing the sensitive element by Belleville spring type washers working in a relatively linear zone, output connections in the shape of a flexible flat insulating strip, particularly of polyimide covered with copper, contribute to this result. Since the rigidity of the polyimide strip is very low it does not interfere with the stresses exerted on the piezoelectric ceramic by the seismic mass. The small height of this latter and the small thickness of the flexible strip, on the order of a few dozen microns, give a slight length to the locking screw and, therefore, a great rigidity. Lateral sensitivity is slight.

The invention, of course, is not limited to the embodiments described and shown. It also comprises all the technical equivalents of the means described and their combinations, if the latter are made in the spirit of the invention and used within the framework of the following claims.

We claim:

1. A sensor for detection of axial accelerations in an internal combustion engine, comprising:
   a case having a base including means for fastening said case to a source of said axial accelerations;
   a piezoelectric element in said case and having an aperture;
   a seismic mass in said case and having an aperture;
   a headed cylindrical element fixed to said base, said cylindrical element passing through said apertures of said piezoelectric element and said seismic mass with said piezoelectric element being positioned on said cylindrical element between said base and said seismic mass;

spring means mounted on said cylindrical element and pressing on said seismic mass for biasing said piezoelectric element between said base and said seismic mass;

electrical output means mounted on said case; and flexible electrical connection means comprising:
  (a) an elongate strip of flexible insulating material having a flat face,
  (b) two annular conductive layers on said flat face,
  (c) apertures through said insulating material at centers of said annular conductive layers, said insulating material being folded at a position between said conductive layers and said insulating material being mounted on said cylindrical member with said cylindrical member passing through said apertures thereof and said annular conductive layers each engaging an opposite side of said piezoelectric element,
  (d) two conductive terminal layers on said flat face at positions spaced from said annular conductive layers and each terminal layer connected to said electrical output means, and
  (e) conductive connecting layers on said flat face and each said connecting layer connecting one of said annular conductive layers with one of said terminal layers.

2. The sensor of claim 1 wherein one of said annular layers is positioned at one end of said strip, wherein said terminal layers are positioned at the other end of said strip, wherein the other of said annular layers is positioned along said strip between said one annular layer and said terminal layers, and wherein one of said connecting layers connecting said one annular layer with one of said terminal layers has a curved portion around said other annular layer.

3. The sensors of claims 1 or 2 wherein said spring means comprise spring washers mounted on said cylindrical element between said seismic mass and the head of said cylindrical element.

4. The sensor of claim 1 wherein said electrical output means comprise:
  a cap fixed to said case opposite said base;
  a cable having two wires and being fixed in said cap; and
  means for electrically connecting each of said terminal layers to one of said wires.

5. The sensor of claim 1 wherein said strip of insulating material is formed of a polyimide.

6. The sensor of claim 2 including a protective strip covering said connecting layers.

7. The sensor of claim 1 wherein said annular layers are positioned adjacent one another at a central portion of said strip and wherein one of said terminal layers is positioned at each end of said strip.

* * * * *